United States Patent [19]
Zrnic

[11] Patent Number: 5,500,646
[45] Date of Patent: Mar. 19, 1996

[54] SIMULTANEOUS DIFFERENTIAL POLYMETRIC MEASUREMENTS AND CO-POLAR CORRELATION COEFFICIENT MEASUREMENT

[75] Inventor: Dusan S. Zrnic, Norman, Okla.

[73] Assignee: The United States of America as represented by the Department of Commerce, Washington, D.C.

[21] Appl. No.: 282,630

[22] Filed: Jul. 29, 1994

[51] Int. Cl.$^6$ .................................................. G01S 13/95
[52] U.S. Cl. ................................................. 342/188; 342/26
[58] Field of Search ........................................ 342/188, 26

[56] References Cited

U.S. PATENT DOCUMENTS

| | | | |
|---|---|---|---|
| 4,742,354 | 5/1988 | Wen | 342/188 |
| 4,849,762 | 7/1989 | Barnes | 342/188 |
| 4,881,077 | 11/1989 | Jehle et al. | 342/26 |
| 5,038,150 | 8/1991 | Bains | 342/373 |
| 5,086,301 | 2/1992 | English et al. | 342/188 |
| 5,175,551 | 12/1992 | Rubin | 342/26 |
| 5,247,303 | 9/1993 | Cornelius et al. | 342/26 |
| 5,420,590 | 5/1995 | Shea | 342/188 |
| 5,434,570 | 7/1995 | Wurman | 342/26 |
| 5,442,359 | 8/1995 | Rubin | 342/109 |

OTHER PUBLICATIONS

Radio Science, vol. 20, No. 4, pp. 907–922, 1985, "Sachidananda and Zrnic, $Z_{DR}$ Measurements Considerations for a Fast Scan Capability Radar".

Preprints, 25th International Conference on Radar Meteorology, American Meteorological Society, Boston, Mass., 1991, p. 622, R. G. Humphries, A. R. Holt, and P. I. Smith, "A Radar Configuration for Monopulse Differential Reflectivity Measurements".

*Primary Examiner*—John B. Sotomayor
*Attorney, Agent, or Firm*—Stevens Davis Miller & Mosher

[57] ABSTRACT

A polarimetric Doppler weather radar system which allows measurement of linear orthogonal polarimetric variables without a switch by using simultaneous transmission of horizontally and vertically polarized waves. This is accomplished by splitting the transmitted power into two waveguides and combining them with an orthomode coupler at the antenna feed. Thus, in general the transmitted polarization is elliptical but with equal amount of power in horizontal and vertical polarization. On reception, the power is divided, at the orthomode coupler, into linear horizontal and vertical components. These components are processed and combined to yield Doppler and polarimetric information about storm structure.

9 Claims, 3 Drawing Sheets

SIMULTANEOUS DIFFERENTIAL POLYMETRIC MEASUREMENTS AND CO-POLAR CORRELATION COEFFICIENT MEASUREMENT

BACKGROUND OF THE INVENTION

1. Field of the Invention

The present invention relates to polarimetric Doppler weather radar in general; and in particular, to a method and apparatus for transmitting and receiving generally elliptically polarized waves to allow measurement of linear orthogonal polarimetric variables, without the need to provide an apparatus with a high power, high frequency switch.

2. Description of the Prior Art

Polarimetric weather radars offer several advantages over conventional radars in estimating precipitation types and amounts. Foremost among them these advantages are the capability to discriminate between hail and rain, detect mixed phase precipitation, and much more accurately estimate rainfall. In one type of these radars, polarization is altered sequentially between linear vertical and linear horizontal to provide the following variables:

a) reflectivity factors at horizontal and vertical polarization;

b) differential reflectivity for the two reflectivity factors;

c) cumulative differential phase between the horizontally and vertically polarized echoes;

d) correlation coefficient between the vertically and horizontally polarized echoes; and e) linear depolarization ratio.

In addition, Doppler velocity and spectrum width can be obtained by suitably processing the horizontally and vertically polarized return signals.

Thus, in the prior art, a transmission system generates horizontal linearly polarized electromagnetic fields and vertical linearly polarized electromagnetic fields. The signal that generates these fields is supplied to a high power, fast switch, which sequentially switches between the two output waveguides so that a series of alternating horizontal and vertical linearly polarized fields are transmitted from the apparatus. Subsequently, the fields are received and processed in the known manner.

The standard procedure of alternating polarization has four drawbacks:

1) a long dwell time is needed to obtain estimates with acceptable errors;

2) an active waveguide switch is needed to alternately select horizontally polarized and vertically polarized waves to the antenna feed (which switch is expensive and difficult to maintain);

3) ground clutter filtering is compromised because it can be best done only on echoes of equal polarization; and, 4) there is appreciable attenuation caused by the switch.

Currently, there is no polarimetric radar which simultaneously transmits horizontal and vertical polarization, and on reception separates the two linear orthogonal components.

In the paper $Z_{DR}$ *Measurement Considerations for a Fast Scan Capability Radar* by Sachidananda and Zrnic (Radio Science, Volume 20, Number 4, pp. 907–22, 1985), a system is proposed wherein linear polarization is transmitted at 45° with respect to the vertical. Sachidananda and Zrnic suggest how to obtain differential reflectivity and phase with such an instrument. A similar proposal for differential reflectivity is provided in *A Radar Configuration for Monopulse Differential Reflectivity Measurements*, by R. G. Humphries, A. R. Holt, and P. L. Smith (Preprints, 25th International Conference on Radar Meteorology, American Meteorological Society, Boston, Mass., 1991, p. 622). The prior art scheme requires that two linear polarizations of equal amplitude and equal phase be combined at a feed node to produce a 45° linear polarization. Although such an arrangement conceptually is simplistic, the requirements of having two linear polarizations of equal amplitude and phase would be very difficult to implement in practice. These two publications are incorporated, in their entirety, by reference.

A potential problem recognized by the Sachidananda and Zrnic is that with any kind of simultaneous transmission depolarization may occur by canted hydrometers along a propagation path; however, measurements made by National Severe Storms Laboratory (NSSL) present no evidence of such systematic canting over long propagation paths.

Other prior systems include that disclosed in U.S. Pat. No. 4,881,077 to Jehle, et al., U.S. Pat. No. 5,086,301 to English et al., U.S. Pat. No. 4,849,762 to Barnes, U.S. Pat. No. 5,247,303 to Cornelius et al., U.S. Pat. No. 5,038,150 to Bains, U.S. Pat. No. 4,742,354 to Wen et al. and U.S. Pat. No. 5,175,551 to Rubin, the entire disclosures of which are incorporated by reference, in their entirety.

SUMMARY OF THE INVENTION

An object of the present invention is to provide a method and apparatus for overcoming the above-noted deficiencies of the prior art.

Another object of the present invention is to provide a polarimetric Doppler weather radar system which does not require a high power, high frequency switch.

Another object of the present invention is to provide a radar system which simultaneously transmits horizontally and vertically polarized waves, without the need to control the phase between the two components.

Accordingly, the present invention provides, in one embodiment, a radar apparatus comprising a transmitter for transmitting a pulse train at a predetermined frequency and power level; a power splitter for splitting the pulse train into a first component and a second component; means for (i) converting the first component into a horizontal polarization waveform, (ii) converting the second component into a vertical polarization waveform, (iii) combining the vertical and horizontal polarization waveforms to output a composite polarization waveform; and an antenna for receiving and transmitting the composite waveform.

Other objects, features and advantages of the present invention will become apparent upon review of the description of the preferred embodiments hereinafter.

DESCRIPTION OF THE PREFERRED EMBODIMENTS

Figure 1:
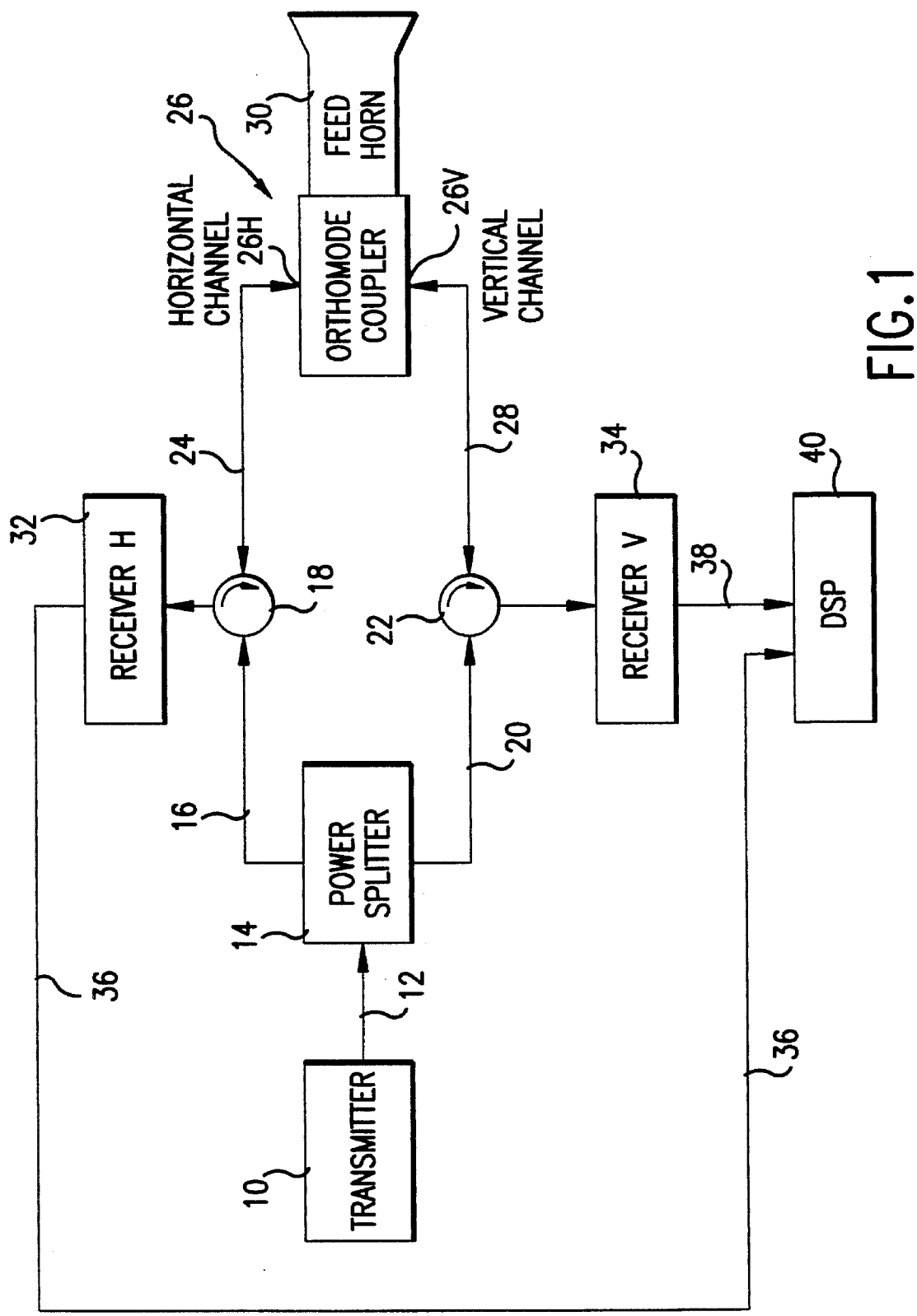
FIG. 1 is a schematic view of the radar system of the present invention.

FIG. 1 is a schematic view of the radar system of the present invention. The system includes in general a transmitter 10 for generating a pulse train. In the preferred embodiment, its pulse repetition time may be one millisecond and the power level may be one megawatt peak. Transmitter 10 is connected to power splitter 14 via first waveguide 12. Power splitter 14 splits the power of the signal received from transmitter 10 into two separate portions, that are respectively fed to circulators 18 and 22, via waveguides 16 and 20. The output from circulator 18 is connected to a horizontal input 26H of orthomode coupler 26 via waveguide 24. Similarly, the output frown circulator 22 is connected to vertical input 26V of orthomode coupler 26 via waveguide 28. As is well known in the art, the construction of orthomode coupler 26 determines the polarization for the input signals. That is, the signal input to horizontal input 26H is converted into a horizontally polarized field, while the signal input to 26V is converted into a vertically polarized field. Orthomode coupler 26 combines the horizontal and vertical polarization components to supply a generally elliptical polarization to feed horn 30 (antenna). The exact shape of the polarization ellipse produced by the orthomode coupler 26 depends upon the relative phase of the horizontal and vertical components. However, as explained infra, since it is unnecessary to maintain a fixed phase relationship between the components, the output will be generally elliptical; yet the output may be circular or even linear. After the polarization is transmitted via feed horn 30, a reflected polarization is received at feed horn 30. Subsequently, orthomode coupler 26 separates the reflected polarization into its horizontal and vertical components. The horizontal component is supplied to horizontal receiver 32 via waveguide 24 and circulator 18. Similarly, the vertical component is supplied to vertical receiver 34 via waveguide 28 and circulator 22. Receivers 32 and 34 perform necessary conversions on their respective components and output signals indicative of their respective components to digital signal processor (DSP) 40 via signal lines 36 and 38. Thus, according to the present invention, orthomode coupler 26 produces a generally elliptical polarization from a horizontal component and a vertical component each having the same power, but not necessarily being in phase with one another (each component does not necessarily have to have the exact same power, but the power levels need to be monitored).

Simultaneous transmission eliminates the need for the switch. Thus one unusual active component of the prior art is not needed in the present invention. A switch must be tuned, must have power supplies, and is fairly large. Furthermore it introduces attenuation. For the same error in estimates, the dwell time with simultaneous transmission is shorter than the time needed with alternating transmission (prior art). The present invention does require two identical coherent receivers and if one transmitter is used the signal to noise ratio in each receiver is reduced by one half.

According to the invention, the differential phase of the transmitted polarization (i.e., phase relationship between the horizontal component and the vertical component) is a function of the physical construction of the apparatus. That is, the waveguides, etc. serve to define the differential phase for the transmitted waveform. This differential phase is thus termed the "system" differential phase.

Various calculations are carried out in DSP 40. It should be noted that although in the preferred embodiment processor 40 is a DSP, it may be any other suitable processing unit (i.e., a standard microprocessor, etc.).

The computation of the polarimetric variables is as follows:

The differential phase is obtained by equation 1.

$$\text{differential phase} = ARG \left\{ \sum_{i=1}^{M} (H_i^* V_i) \right\} \quad (1)$$

Where ARG is the argument of the complex result of the summation; H is the complex echo voltage for the horizontal polarization, V is the complex echo voltage for the vertical polarization, and M is the number of samples. It should be noted that the asterisk above H represents that this is the complex conjugate value. The H* and V values are obtained simultaneously with one another, and are processed in the respective receivers 32 and 34. These Values are obtained at the same range delay, and a summation is performed over the entire dwell time.

The correlation coefficient is obtained between H* and V complex samples. This value is obtained In the standard manner In accordance with equation 2.

$$\text{correlation} = \frac{\left\{ \sum_{i=1}^{M} (H_i^* - \overline{H}^*)(V_i - \overline{V}) \right\}}{\sigma_H \sigma_V}$$

where M is the number of samples, $H_i^*$ is the complex conjugate of the complex echo voltage for the horizontal polarization for a given sample i, $\overline{H}^*$ is the average complex echo voltage for the horizontal polarization, $V_i$ is the complex echo voltage for vertical polarization for a sample i, $\overline{V}$ is the average echo voltage for the vertical polarization, $\sigma_H$ is the standard deviation of the H values, and $\sigma_v$ is the standard deviation of the V values. For weather signals $\overline{H}^*$ and $\overline{V}$ are equal to zero.

The differential reflectivity is obtained as a difference between the reflectivity factors for horizontal ($Z_H$) and vertical ($Z_v$) polarizations in units of dBZ.

Of course, by subtracting the system differential phase from the calculated values for the differential phase of the received polarization wave forms, the differential propogation phase can be determined.

Both the differential phase and correlation coefficient are relative measurements completely independent of calibration, For example, there is no need to adjust waveguide lengths to compensate for the differential phase of the system. This is because the meteorologically significant variable is the specific differential phase $K_{dp}$ which is a range derivative of the differential phase. Thus, $K_{dp}$ is independent of the system differential phase.

The differential reflectivity is critically dependent on the relative system calibration, i.e., the relative gains of receivers, and losses in two waveguides and the power splitter. Two workable methods for relative gain calibration are now described.

a) After each volume scan, a calibration of both receivers is performed by using a part of the signal from the transmitter in each of the receivers to digitally perform correction of amplitudes and phases.

b) Calibration can also be performed by using echoes from the ground at both polarizations. The histogram of differential reflectivity (at 10 cm wavelength) is symmetric if the overall system transfer is the same. Otherwise, the correction factor for differential reflectivity is equal to the offset of the histogram from zero.

Figure 2:
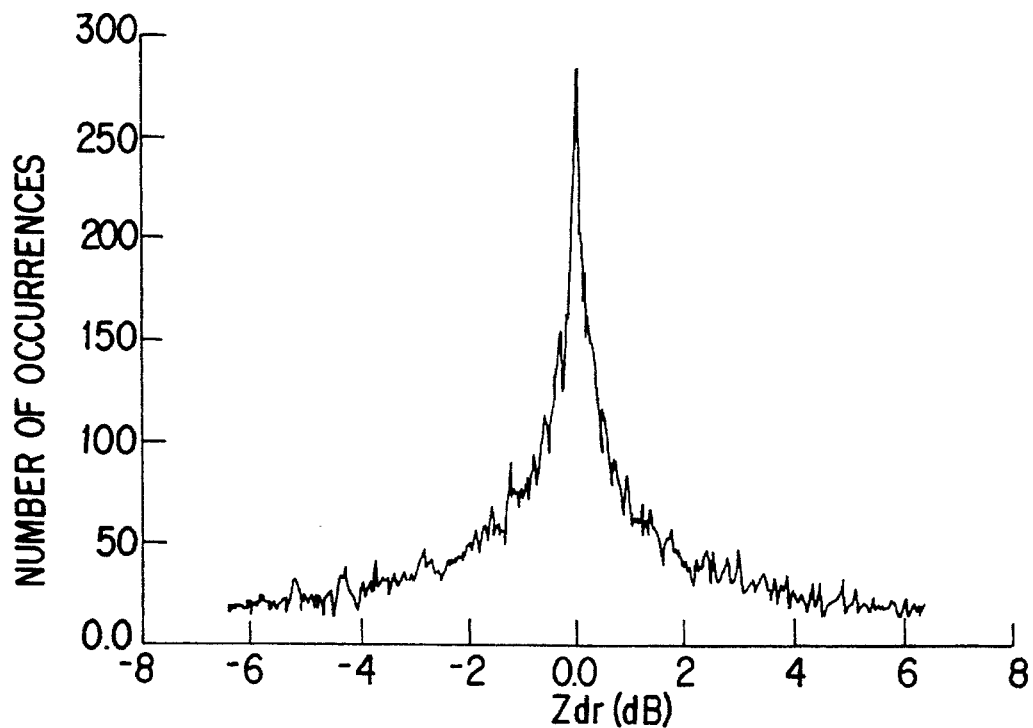
FIGS. 2 and 3 illustrate histograms of the differential reflectivity obtained in a radar system.

The symmetry and zero offset of the histogram of the differential reflectivity may be seen by referring to FIG. 2,3. This data was obtained with a switchable dual polarization radar.

Figure 3:
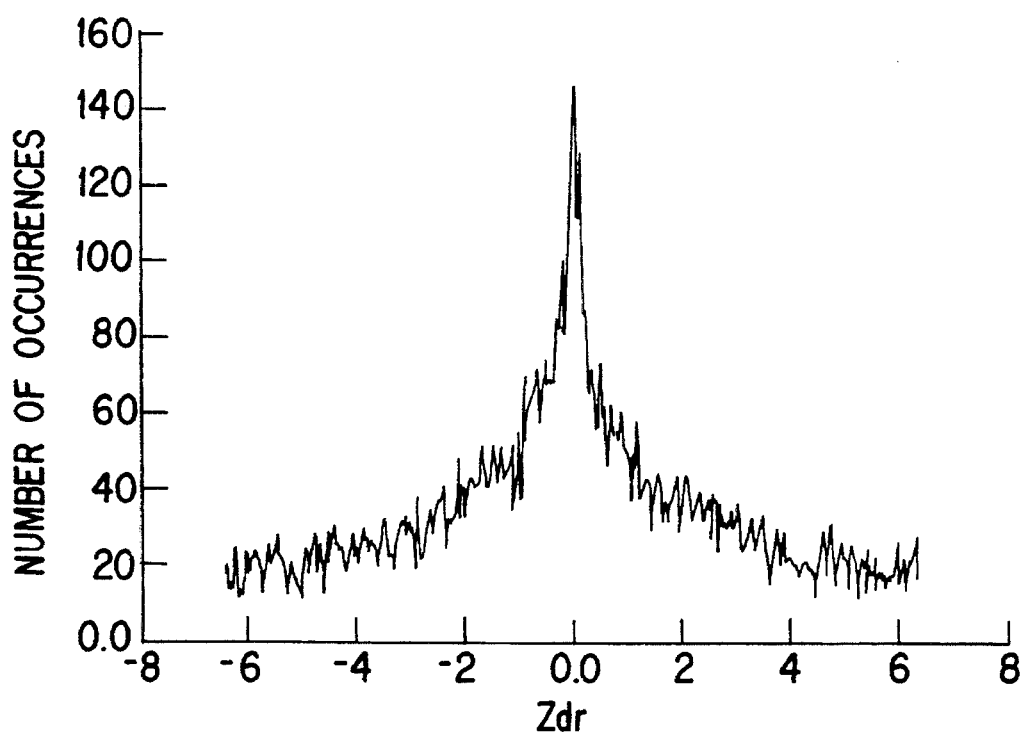

FIG. 2 illustrates a histogram for the differential reflectivity at 10 cm wavelength, wherein the antenna was set to have an elevation of 0.5° with respect to the ground, and the unit was rotated through 0° to 160°. FIG. 3 illustrates the histogram at the same wavelength and elevation when the unit is rotated through 270° to 360°. As is clear from review of each of these figures, the histogram values are symmetrical about 0.

Figure 4:
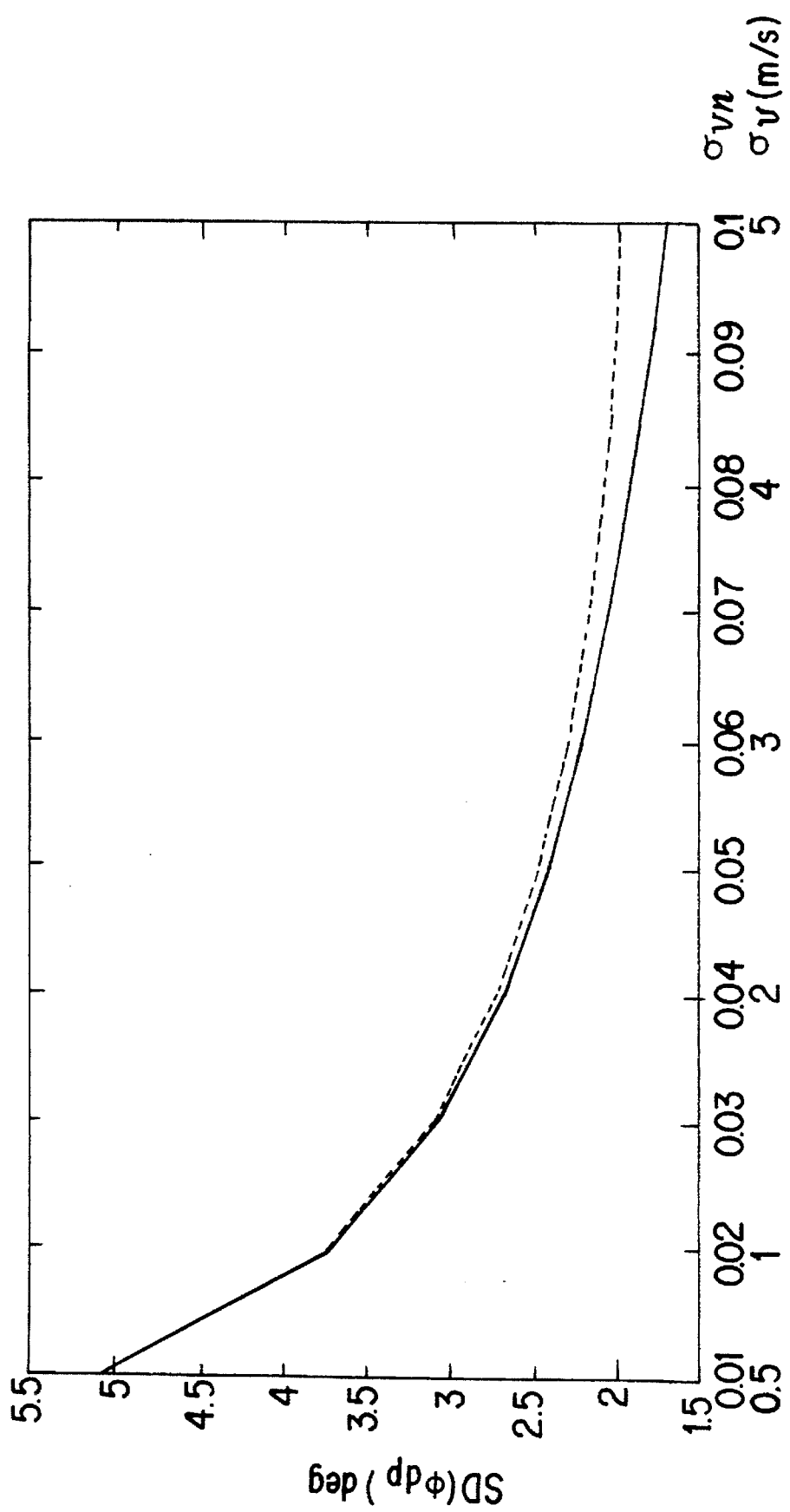
FIG. 4 is a comparison graph of the present invention to the prior art.

FIG. 4 is a comparison of the present invention to the prior art, which is a graph comparing the standard deviation of the differential phase in degrees (vertical axis) to the spectrum width (horizontal axis). The uppermost scale on the horizontal axis illustrates the normalized spectrum width $\sigma_{vn}$, while the lower scale illustrates the non-normalized spectrum width in $ms^{-1}$. The curves in FIG. 4 are for the correlation between the horizontal and vertical components at zero lag being 0.92 (i.e., $\rho_{HV}$ (0)=0.92). The values obtained in FIG. 4 assume that the dwell times are the same, the SNR is large, and an unambiguous velocity interval of 50 m/s (at a pulse repetition time of 1 millisecond at 10 cm wavelength). It should be noted that FIG. 4 Is a theoretical graph only. Referring to this graph, it can be seen that the present invention (solid line) is better than the prior art (dotted line).

Thus, it is clear that the present invention defines a novel and useful radar system.

The present invention is well suited to be applied on WSR-88D weather radars. It is estimated that there will be over 140 such radars by 1997 in the United States and there could be over 50 in other countries. The present invention is also very attractive for use on shorter wavelength radars (3 and 5 cm) because measurement of phase is independent of attenuation. The market for shorter wavelength radars is much larger because of the inherent lower price and could include weather radars for commercial aircraft. Elimination of the high power, high frequency switch of the prior art would allow inexpensive polarimetric measurements at these wavelengths.

Having thereby described the subject matter of the present invention, it will be apparent that many substitutions, modifications and variations of the invention are possible in light of the above teachings without departing from the scope of the invention.

What is claimed is:

1. A radar apparatus comprising:

a transmitter for transmitting a pulse train at a predetermined frequency and power level;

a power splitter for splitting said pulse train into a first component and a second component;

coupler means for (i) converting said first component into a horizontal polarization waveform, (ii) converting said second component into a vertical polarization waveform whose frequency is equal to a frequency of said horizontal polarization waveform, (iii) transmitting simultaneously said vertical and horizontal polarization waveforms to produce a composite polarization waveform and (iv) receiving said composite polarization waveform and decomposing said composite polarization waveform into horizontal and vertical components; and an antenna for receiving and transmitting said composite waveform.

2. An apparatus according to claim 1, wherein said coupler means comprises an orthomode coupler.

3. An apparatus according to claim 1, wherein said antenna comprises a feed horn.

4. A radar apparatus comprising:

a transmitter for transmitting a pulse train at a predetermined frequency and power level;

a power splitter for splitting said pulse train into a first component and a second component;

coupler means for (i) converting said first component into a horizontal polarization waveform, (ii) converting said second component into a vertical polarization waveform, and (iii) combining said vertical and horizontal polarization waveforms to output a composite polarization waveform;

an antenna for receiving and transmitting said composite waveform;

a first circulator connected between a first output of said power splitter and a first input of said coupler means;

a second circulator connected between a second output of said power splitter and a second input of said coupler means;

a first receiver having an input connected to said first circulator and an output;

a second receiver having an input connected to said second circulator and an output;

a calculation means connected to receive said output from said first receiver and said output from said second receiver, wherein upon reception of a reflection of said composite waveform:

said coupler means separates said reflected waveform into a reflected horizontal component and a reflected vertical component and outputs said reflected horizontal component to said first circulator and outputs said reflected vertical component to said second circulator, said first circulator supplies said reflected horizontal component to said first receiver, said second circulator supplies said reflected vertical component to said second receiver, said first and second receiver convert, respectively, said reflected horizontal and vertical components into first and second information signals, and said calculation means performs various calculations in accordance with said first and second information signals.

5. An apparatus according to claim 4, wherein said coupler means comprises an orthomode coupler.

6. An apparatus according to claim 4, wherein said antenna comprises a feed horn.

7. An apparatus according to claim 4, wherein said calculation means comprises a digital signal processor (DSP).

8. An apparatus according to claim 5, wherein said calculation means comprises a digital signal processor (DSP).

9. An apparatus according to claim 6, wherein said calculation means comprises a digital signal processor (DSP).

* * * * *